United States Patent [19]
Ralston

[11] 3,881,992
[45] May 6, 1975

[54] OPTICAL RATE MEASUREMENT METHOD

[76] Inventor: Wilson Ralston, 99 Prospect St., Stamford, Conn. 06901

[22] Filed: July 2, 1973

[21] Appl. No.: 375,418

[52] U.S. Cl............ 195/103.5 R; 23/230 R; 356/96; 356/184
[51] Int. Cl.......... C12k 1/00; G01j 3/42; G01j 3/48
[58] Field of Search .......... 23/230 R, 253 R, 230 B; 145/103.5 R, 127

[56] References Cited
UNITED STATES PATENTS

| | | | |
|---|---|---|---|
| 3,542,515 | 11/1970 | Scott................................. | 23/230 R |
| 3,633,012 | 1/1972 | Wilhelmson et al............. | 356/96 X |
| 3,713,986 | 1/1973 | Bergmeyer et al.......... | 195/103.5 R |
| 3,725,204 | 4/1973 | Marshall, Jr. et al. ........ | 23/263 R X |
| 3,806,422 | 4/1974 | Moyer et al.................. | 195/103.5 R |

OTHER PUBLICATIONS
Dixon et al., Enzymes, pp. 87, 88, 108–111, 2nd Ed., (1964), QP601D5e.

*Primary Examiner*—Joseph Scovronek
*Attorney, Agent, or Firm*—Frank J. Thompson

[57] ABSTRACT

A method for clinical analysis is provided by combining a reagent with a sample composition and causing an enzymatic reaction thereof, projecting a light beam at the composition as the reaction progresses, providing a first electrical signal which is proportional to the absorbance of light by the composition, providing a second electrical signal which is substantially proportional to the first derivative of the first absorbance signal, continuously averaging the second signal for a predetermined interval of time, and coupling the second signal to an indicating means for providing a continuous visible display representative of the rate of reaction.

5 Claims, 5 Drawing Figures

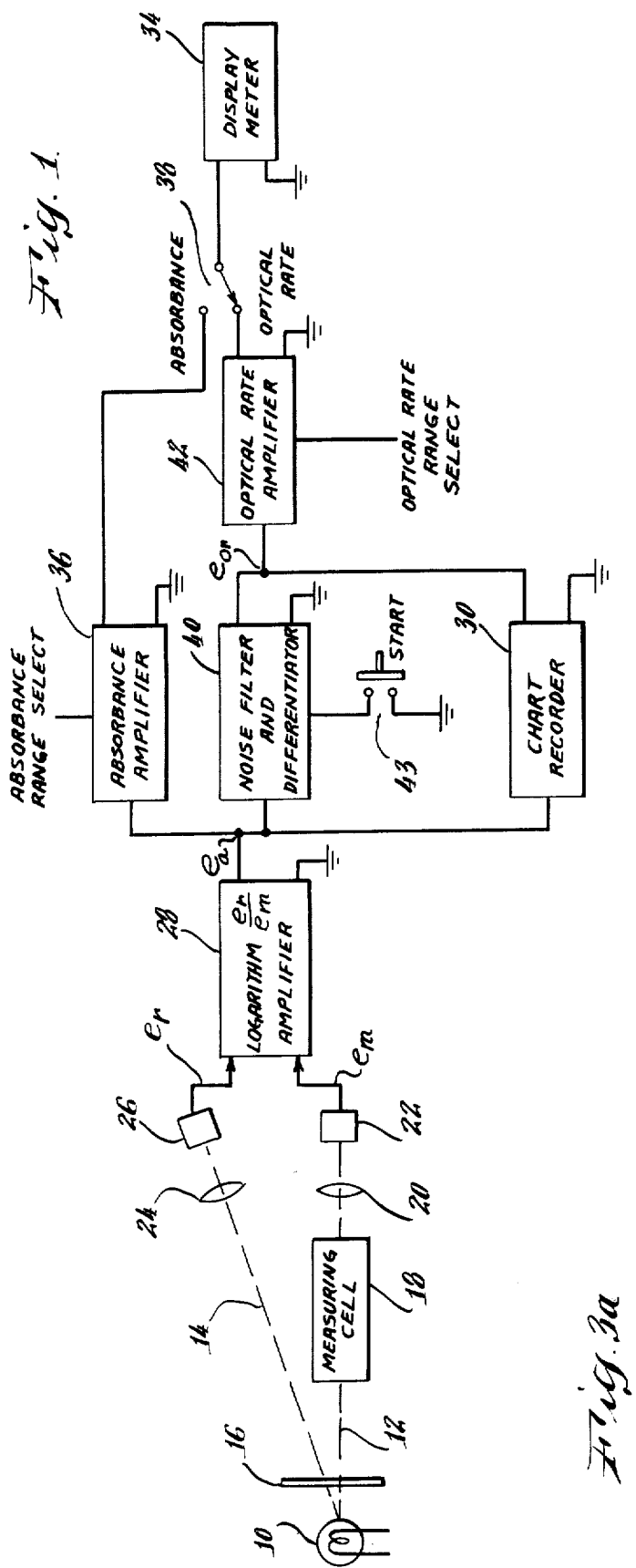
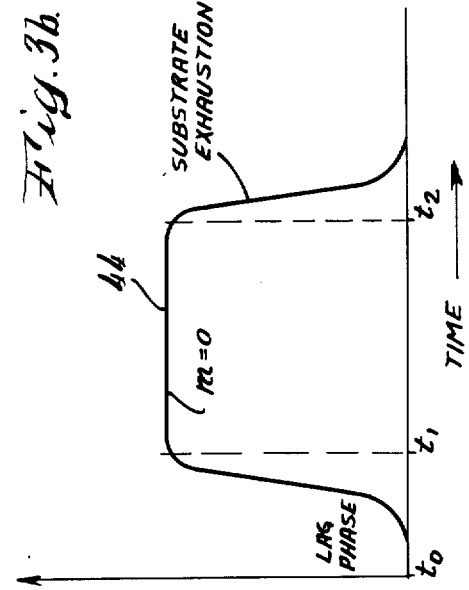
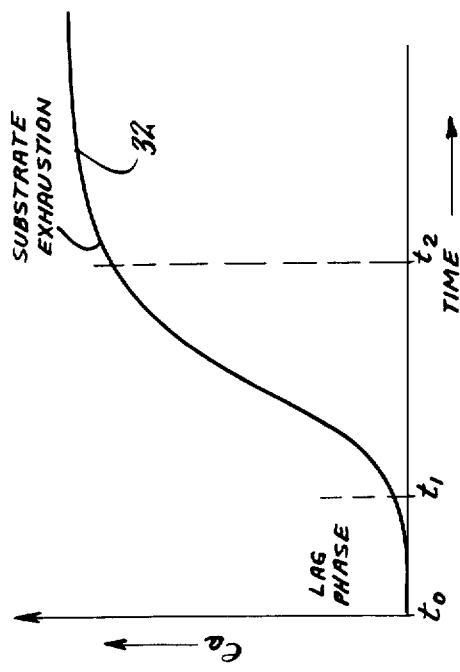

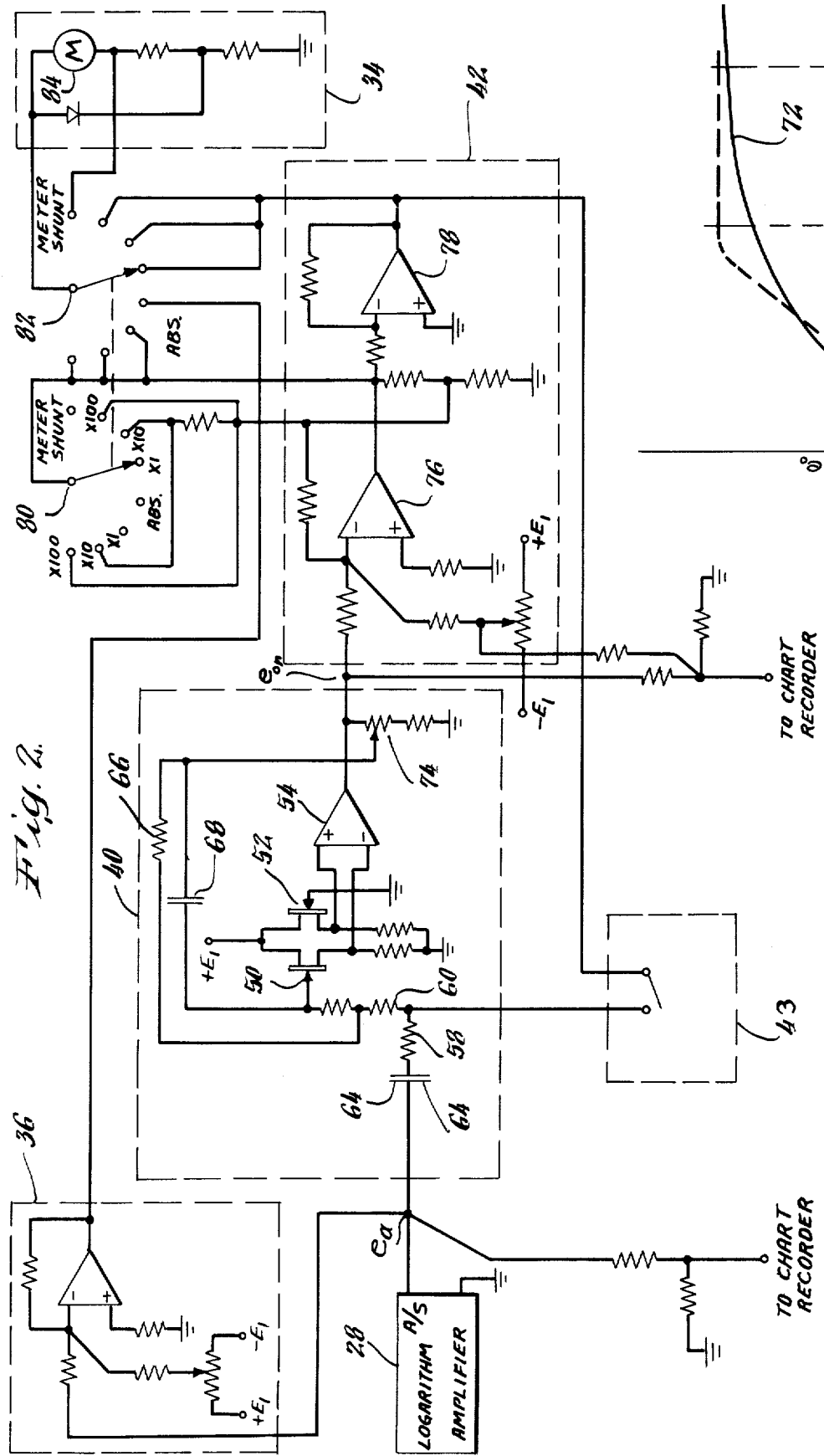

OPTICAL RATE MEASUREMENT METHOD IMPROVED OPTICAL RATE MEASUREMENT METHOD AND APPARATUS

This invetion relates to an improved method and apparatus for perfoming analytical and clinical measurements. The invention relates more particularly to improved analytical and clinical methods and apparatus which provide an indication fo the rate of reaction of a sample under analysis.

In a known analytical and clinical technique, which is generally referred to as an optical rate measurement, the presence or absence of a substance in a composition is determined by causing a reaction of the composition and by sensing the rate of variation of an optical characteristic of the composition as the reaction progresses. The reaction may be caused for example by combining a reagent with the composition or by heating the composition while a variation in the optical characteristic of the composition is sensed by projecting a light beam at the composition during the reaction and by detecting, for example, changes occurring in the transmission, the absorption, or the scattering of light by the composition. The magnitude of the variation of the optical characteristic is generally indicative of the concentration of a substance in the composition. The rate at which the magnitude of the optical characteristic varies as the reaction progresses is also important since it provides additional, significant analytical or diagnostic information. For various reasons, prior determinations of the rate at which the optical characteristic changes have been relatively inaccurate or have not provided results which are meaningful over the entire period of the reaction.

The limitations in the measurement of the rate of reaction can be more fully appreciated by the consideration of an exemplary clinical instrument which detects enzymes. As is known, enzymes are proteins with specific catalytic functions and are present in each cell of the human body. Normally the activities of the many enzymes in the body are maintained at a relatively constant level by a balance between enzyme synthesis and breakdown. In blood serum the activities of these enzymes are relatively low and very only within relatively narrow limits. Increased enzyme activity above the normal value is indicative of cell damage and provides an important means for diagnosing disease in various body organs.

The enzyme concentration in blood serum is normally relatively small and is gnerally not susceptible ot measurement by a conventional protein assay. Instead, the enzyme catalytic function is measured by measuring the rate at which a catalyzed reaction takes place. A typical enzyme catalyzed reaction involves the oxidation or reduction of the coenzyme NAD.

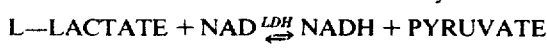

L—LACTATE + NAD ⇌ NADH + PYRUVATE

NAD is the form which is colorless at 340 nm. The enzyme LDH catalyzes the reduction of NAD to give NADH, the reduced form, which absorbs light strongly at 340 nm. Thus, the magnitude of an optical characteristic comprising the absorbance of light at 340 nm is indicative of the concentration of NADH and the rate of change of absorbance indicates the rate of conversion of NAD to NADH. This in turn is proportional (within limits) to the amount of catalytic agent, namely enzyme (LDH), which is present in the composition. Besides being proportional to the amount of enzyme present, the rate of reaction is also dependent on the amount of substrate that remains unconverted. That is, as the reaction progresses, the quantity of remaining substrate is being continuously depleted and the rate of reaction will accordingly decrease. The rate of reaction is additionally dependent on the pH of the solution and on its temperature. The temperature sensitivity of the reaction rate is typically about 10%/°C. and an instrument which is to accurately measure reaction rate should provide a reproducible constant temperature environment.

Two methods are known for measuring the level of enzyme activity. The more commonly employed method is termed the "endpoint" method. With this method, absorbance is measured both before the chemical reaction is initiated and after the reaction has progressed substantially to completion. The difference in absorbances measured before and after the reaction is proportional to the amount of enzyme present. While this method has the advantage of measurement simplicity, it undesirably requires a relatively long time interval for the reaction to progress to near completion and is also subject to relatively high false readings as a result of chemical interferences.

The second method is known as the "kinetic" method. It has the advantage that it is more chemically specific and is relatively free from chemical interferences. It is also a potentially faster method since it does not require the reaction to go to completion. One disadvantage of this method is that it requires measurement of very small changes in absorbance and a high degree of electrical and mechanical stability during the measurement.

Present day instruments for performing the kinetic test generally employ an absorbance measuring photometer which provides an output signal for application to a chart recorder. The reaction is initiated and a recording of sample absorbance vs. time is made over a period of several minutes. After this recording is completed, the instrument operator utilizes a straight edge and draws a line tangent to the recorded curve at that segment of the curve corresponding to the initiation of the reaction. Having determined the initial slope of the curve from this measurement, the initial rate of reaction is calculated and is multiplied by a constant factor in order to provide an answer in units of enzyme activity.

Another type of instrument for performing the kinetic test makes two absorbance measurements at different times during a reaction and calculates the absorbance slope and thus the rate of reaction by computing the ratio of the change in absorbance to the time interval. The result is then displayed on a digital output meter or printer. Both of these methods for performing the kinetic test are disadvantageous in that they measure a change in absorbance over a relatively long time interval and are thus subject to errors arising as a result of curvature in the absorbance-time curve. This is especially apparent when analyzing samples with high activity. In addition, instruments using the second method make it difficult to determine when a chemical lag phase has ended and thus often give erroneous readings.

In order to provide a relatively highly accurate determination of the quantity of enzyme catalyzing a reaction, it is desirable to measure the rate at which absorbance changes immediately after the end of the lag phase and to perform the measurement in a relatively short interval of time compared to the period of time required for completing the reaction. It is important that the measured rate at which absorbance changes be as close as is pratical to the initial rate of change just after a lag phase since the reaction rate also depends on the amount of substrate present and, as the reaction proceeds, the substrate is depleted thereby causing the rate to decrease even though the enzyme level may remain substantially constant. It is additionally desirable to monitor the rate of absorbance change as the reaction progresses since this provides further information with respect to false readings which can arise from curvature in the absorbance vs. time curve, from lag phase, from noise producing particles or from Fibrinogin, i.e. particles formed by blood clotting, suspended in the serum. However, monitoring of the rate of absorbance change is subject to substantial noise interference.

Accordingly, it is an object of this invention to provide an improved form of analytical or clinical instrument which is adapted for measuring and indicating the rate at which a reaction occurs.

Another oject is to provide a clinical instrument having means which provide for visually discriminating against false readings of sample activity resulting from noise producing particles, or Fibrinogin floating in the serum.

Another object of the invention is to provide an analytical or clinical instrument which is adapted for monitoring the activity of a sample throughout the progress of a reaction and for providing and continuously displaying the first time derivative of the activity of the sample.

Another object of this invention is to provide an analytical or clinical instrument adapted for performing a rate measurement in a relatively short time interval immediately after the end of lag phase and before absorbance curvature becomes significant.

Another object of the invention is to provide a clinical instrument having improved sensitivity and repeatability.

Another object of the invention is to provide a clinical instrument which simultaneously provides output signals representative of absorbance and the first time derivative of absorbance.

Another object of the invention is to provide an improved clinical or analytical instrument having electrical noise suppressing means for suppressing electrical noise and enhancing continuous measurement and display of a rate of change signal.

Another object of the invention is to provide a clinical instrument having filtering means for averaging the noise of the first derivative signal and having a relatively linear charging characteristic for minimizing the time required for equilibration to the sample reading for a given amount of noise averaging.

Another object of the invention is to provide a clinical instrument having a reset means for causing capacitive reactive elements of a filter and differentiator to attain an equilibrium corresponding to a zero indication on an output rate indicator.

The method of the present invention is provided by causing the reaction of a sample composition, projecting a light beam at the composition, detecting a variation in an optical characteristic of the composition as the reaction progresses, providing an electrical signal which is proportional to the rate of change of the optical characteristic and providing a continuous visible display representative of the magnitude of the electrical signal. Through this method, the instrument user is provided with a measurement of the rate of reaction as the reaction is initiated and with continuous and direct monitoring of sample activity. Thus, the rate of reaction is measured at a time during the reaction when the rate is highly accurate and false readings of sample activity resulting from Lag Phase, absorbance curvature, noise producing particles or Fibrinogin suspended in a serum may be visually discriminated.

In accordance with more particular features of the method of this invention, an enzyme analysis is provided by combining a reagent with a sample composition and causing a reaction thereof, projecting a light beam at the composition as the reaction progresses, providing a first electrical signal which is proportional to the absorbance of light by the composition, providing a second electrical signal which is substantially proportional to the first derivative of the first absorbance signal, continuously averaging the second signal for a predetermined interval of time, and coupling the second signal to an indicating means for providing a continuous visible display representative of the rate of reaction.

In accordance with features of the apparatus of this invention, there is provided a light source, means for projecting a light beam from the source at a sample composition which is undergoing reaction, photosensitive detection means positioned for receiving light which is transmitted through said composition and for providing a first electrical signal which is proportional to the absorbance of light by the composition, differentiating circuit means for providing a second electrical signal which is substantially proportional to the rate of change of the absorbance signal, analog filtering means for providing averaging of the differentiated signal for a predetermined interval of time, a visual indicator, and means for coupling the second signal to the indicator for providing throughout a principal part of the reaction a continuous display representative of the rate of reaction. In accordance with other features of the invention, a switching means for equilibrating a charge on capacitive, reactive elements of the filter and differentiator to a zero rate indication and indications of the absorbance and rate of reaction are displayed simultaneously.

These and other objects and features of the invention will become apparent with reference to the following specification and to the drawings wherein:

FIG. 1 is a schematic diagram, partly in block form, of an instrument employing the present invention;

FIG. 2 is a more detailed circuit diagram of a portion of the instrument of FIG. 1;

FIGS. 3a and 3b are diagrams illustrating curves of absorbance and rate of change of absorbance respectively for an enzyme analysis performed with the instrument of FIG. 1; and, FIG. 4 is a diagram illustrating the response curves of a noise suppression filter employed with the instrument of FIG. 1.

Referring now to FIG. 1, there is illustrated a clinical instrument which includes a photometer for measuring and indicating changes in the absorbance of a sample material under investigation. While an enzyme analysis type of clinical instrument will be described, it will be apparent that the invention is equally applicable to other forms of instruments such as analytical instruments, to other forms of clinical instruments for performing analyses other than enzyme analyses, and to other forms of clinical instruments which perform enzyme analyses by other means such as by rate florescence or by nephelometry and to other enzyme techniques such as immunological reactions for drug analysis utilizing enzyme "labeling" or "tagging." The photometer of FIG. 1 includes a light source 10 comprising an ultraviolet fluorescent lamp which is arranged for projecting light beams over a measuring path 12 and over a reference path 14. An interference filter 16 is positioned in the path of the projected light beams for selectively transmitting along the measuring and reference path light beams of a predetermined wavelength. The interference filter 16 may, in the case of one type of enzyme analysis, transmit a light beam having a wavelength on the order of 340 nm. A light beam which is projected along the measuring path 12 impinges upon a translucent measuring cell 18 comprising a cuvette or sample tube formed of glass or other light transmitting material. The cuvette contains a composition which is undergoing reaction. The composition may comprise for example, those components on the left-hand side of the reaction equation of enzyme analysis enumerated hereinbefore. A lens 20 is provided for focusing light which is transmitted through the cell 18 on photodetector 22. The photodetector 22 provides an output signal $e_m$ which has an amplitude proportional to the intensity of the light impinging thereon. Similarly, a lens 24 is provided for focusing light transmitted along the reference path 14 on a photodetector 26. The photodetector 26 also provides an output signal $e_r$ which is proportional to the intensity of the light at the source 10. The output signals from the photodetectors 22 and 26 are coupled to an amplifying circuit arrangement 28 which provides an output signal $e_a$ which is proportional to log. $e_r/e_m$ and which, as is known, is proportional to the absorbance of light by the measuring cell 18. The absorbance signal $e_a$ is applied to a recording means comprising a chart recorder 30 for providing a recorded visual display of the variations in the amplitude of the absorbance signal $e_a$ over an interval of time. An absorbance curve is illustrated by the curve 32 of FIG. 3a which illustrates a clinical measurement for determining enzyme catalytic action. The absorbance signal $e_a$ is also applied to a display meter 34 through an amplifier 36 and a switching means 38. The display meter 34 provides for the display of the magnitude of the signal $e_a$ and thus, the variations in the magnitude of the optical characteristic (i.e. absorbance) as the reaction progresses. The absorbance signal amplifier 36 includes amplitude range selecting means which provides for full-scale deflection of the display meter 34 over various ranges of amplitude levels of absorbance signal.

In accordance with a feature of the invention, a circuit means is provided for forming the first derivative of the absorbance signal $e_a$ and for providing a continuous display of this signal during the progress of a substantial part of the reaction. The differentiation of the signal $e_a$ is enhanced by the use of a noise filter which substantially suppresses input noise signal components. The noise filter comprises an active filter which averages the input signal $e_a$ over an interval of time and which exhibits a relatively linear charge up with time and with a minimum amount of "end tail" as the reading is approached. This characteristic is described in more detail hereinafter with reference to FIG. 4. The noise filter and differentiator which is referred to in FIG. 1 by the reference numeral 40 provides an optical rate output signal $e_{or}$ which is applied to the display meter 34 by the switching means 38 via an optical rate amplifier 42. The optical rate signal $e_{or}$ is also applied to a recording means comprising the chart recorder 30 for providing a permanent record of the variations of the optical rate over the period of the reaction. A start switching means 43 is provided for equilibrating the charge on capacitive reactive elements of the Filter and Differentiator to a zero rate condition until the reaction is initiated. The optical rate amplifier 42 includes an optical rate range selecting means for providing a full-scale meter display for a range of amplitude levels of the input signal $e_{or}$. The switching means 38 is adapted for selectively coupling the amplified absorbance $e_a$ or the amplified optical rate signal $e_{or}$ to the display meter 34 for alternative continuous display of these characteristics. Alternatively, a second display meter may be provided and the absorbance signal and the optical rate signal may be simultaneously and continuously displayed by associated meters during the progress of the reaction. The curve 32 of FIG. 3b illustrates a typical optical rate vs. time characteristic for enzyme reaction.

In a typical operation for rapid kinetic analysis for transaminase, lactate dehydrogenase and other enzymes which are measured kinetically at 340 nm., the instrument operator initially determines from prior knowledge whether the absorbance will increase or decrease with time as the reaction proceeds. The switching means 38 is operated to the optical rate location and the optical rate range selecting means as well as the absorption range selecting means are adjusted to provide the desired full-scale deflection for the level of signals anticipated with the particular reaction. A quantity of reagent is then deposited into a measuring cell and is initially placed into a pre-incubating well for a period of about 2 to 5 minutes in order to equilibrate to a predetermined temperature of 37°C., for example. A quantity of sample as for example serum is then deposited into the measuring cell and is mixed with the reagent by inversion. Based upon a preliminary estimate of the reaction which is expected, the measuring cell is then replaced in the pre-incubator well for an interval of time equivalent to the lag phase or period. The lag period represents an interval of time during which an initial delay in the reaction between the components occurs. This interval of time is represented in FIG. 3a and in FIG. 3b by the time period $t_o$–$t_1$. Immediately before the time $t_1$ occurs, the measuring cell is then placed in the measuring path 12. Alternatively, when it is desired to also view the complete reaction including the lag phase interval, the measuring cell is placed in the measuring path 12 immediately after inversion and mixing of the components. The instrument operator will then activate the start switch 43 which has normalized the electrical conditions of circuit components of the differentiator and filter until the reaction is initiated. A continuous display of the rate of change of absorbance will be provided by the meter 34 while the chart recorder will provide a visual record of both the absorbance as illustrated by curve 32 in FIG. 3a and the rate of reaction as illustrated by curve 44 in FIG. 3b.

The peak reading of the meter 34, when calibrated in International Units (I.U.) as described hereinafter, provides an accurate indication of rate of change of the reaction. This reading corresponds to the segment $m=0$ of curve 44 in FIG. 3b. The provision of a continuously displayed rate of change signal as illustrated in FIG. 3b is an extremely valuable tool for the instrument operator in interpreting the events occurring during the reaction. For example, because of the depletion of unreacted substrate during an enzyme catalyzed reaction, the most significant and reliable indication of the rate of change of absorbance is provided by the initiation of the reaction. However, as can be seen from FIG. 3a, the time at which the lag phase interval terminates and the reaction is initiated can be readily mistaken. On the other hand, by providing the first derivative of this function, the entry into the reaction phase can be readily delineated as is clear from the curve of FIG. 3b where the slope $m$ of the curve equals 0. Similarly, the time at which the substrate is substantially depleted and the reaction if effectively terminated can also be confused with information obtained solely from the absorbance curve of FIG. 3a while the curve of FIG. 3b also clearly delineates this phase of the reaction. Thus, by providing the continuous display of the first derivative of the absorbance, the instrument operator will have displayed for his use a clear indication of the occurrence of events such as the initiation of a reaction and the termination of a reaction. This, therefore, provides him with a tool for identifying chemical interferences and attributing a proper meaning to them.

The circuit arrangement for operating on the output signal $e_a$ of the amplifier 28 and particularly the differentiating and noise filtering means of FIG. 1 is illustrated in greater detail in FIG. 2. Those elements of FIG. 2 which perform the same function as similar elements of FIG. 1 bear the same reference numerals. The signal $e_a$ is applied to the noise filter and differentiator which is represented within the dashed rectangle 40 in FIG. 2. the noise filter comprises an active filter which is adapted for averaging noise over an interval of time prior to taking of a first accurate, peak reading. The effective averaging time of the filter and its frequency characteristic are factors which determine the noise level and also determine the time required before the activity of the sample can be read. This in turn determines the "throughput" or the rate at which samples can be measured. To this end, it is desirable to provide a filter which has the least "end-tail" for a given effective averaging time. While a relatively simple filter for averaging noise comprises a resistance-capacitance (RC) network arranged as an integrator, the effective averaging time of this arrangement is largely determined by the initial charge-up rate. Although the capacitive element in this type of filter will acquire about 63 percent of its final charge during the period of one time constant T, the end-tail which comprises that portion of the RC charging curve during which the capacitive element acquires substantially the remaining 37 percent of the final charge, occupies a relatively long interval of time. As an example, a simple first order RC filter circuit requires about 4.6 time constants in order to charge up to within about 1 percent of the final charge level. The end-tail then occupies about 3.6 time constants. With routine use of clinical instruments, it is desirable to obtain accurate readings as soon as possible. While the characteristics of the RC filter circuit can be selected for providing relatively fast charging, this is accomplished only by reducing the interval of time over which noise is averaged and results in increased noise activity. The filter arrangement of FIGS. 1 and 2 comprises a higher order active filter which is arranged for minimizing end-tail while at the same time providing enhanced noise averaging. This is accomplished partly by adjusting the damping factor of the filter to a value of about 0.85–0.90. This is just slightly underdamped and produces an overshoot in the response of under 1 percent. The noise filter includes field effect transistors 50 and 52 as well as a feedback amplifier 54 which are arranged in a current summing amplifier configuration. The noise filter elements include the resistances 58 and 60 and the capacitances 64 and 68. Feedback from the amplifier 54 is provided by the resistance 66 while capacitive feedback is provided by the capacitance 68 which operates to reduce the end tail on charge-up by reducing the overall filter dampening factor below that for critical damping. As a result, the response of this filter including differentiator to a ramp input in enhanced as is illustrated by the curve 70 in FIG. 4 when compared with the response curve 72 of a simple RC filter network plus differentiator. The start or go switch means 43 as illustrated in FIG. 2 comprises a toggle switch which is operated to normalize or establish an initial state of charge on the capacitors 64 and 68 until initiation of the reaction.

The rate of change of reaction of enzyme activity may be displayed by the meter 34 in international units. The international unit is defined as $dA/dt \times F$ where F is a predetermined factor of constant. The feedback of the current summing amplifier includes an adjustable resistive impedance 74 for calibrating the instrument in terms of international units. The rate signal $e_{or}$ provided by the noise filter and differentiator 40 is applied to the optical rate amplifier 42 which includes a first stage 76 and a second stage 78 of inverting amplifiers. Switching means 80 and 82 are provided for controlling the gain of the absorbance amplifier 36 and the optical rate amplifier 42. The function of the switching means 38 is incorporated in FIG. 2 into the switching arrangement provided by the switching means 80 and 82. In addition, the switching means 80 and 82 are adapted for providing a shunt across a meter element 84 of the display meter means 34.

There has thus been described an improved instrument which advantageously provides a continuous display of an optical rate of change in a clinical instrument and greatly facilitates the conduct and interpretation of an analysis. In addition, an enhanced noise averaging and filtering arrangement is provided which reduces the time interval before which an accurate reading can be taken while simultaneously maintaining a high level of noise suppression. This enhances the taking of the first derivative of the absorbance signal, for example, and increases the through-put of the instrument.

While I have described a particular embodiment of this invention, it will be appreciated by those skilled in the art that various modifications may be made thereto without departing from the spirit of the invention and the scope of the appended claims.

I claim:

1. A method for kinetic enzyme analysis for rapidly providing an indication of the linearity of enzyme reaction comprising:

combining a reagent with a sample composition for causing an enzyme catalyzed reaction thereof;

said reaction exhibiting a lag phase, an intermediate reaction phase and a terminating substrate exhaustion phase;

projecting a light beam at the composition as the reaction progresses;

detecting the absorbance of said light beam and providing a first electrical signal which is proportional to the absorbance of the light by the composition undergoing reaction;

applying said first signal to signal filtering and differentiating means for providing a second electrical signal which is substantially proportional to the first derivative of the first absorbance signal;

causing reactive elements of a signal filtering and differentiating means to equilibrate to a zero rate condition prior to analysis;

continuously averaging the second signal for a predetermined interval of time from said zero rate condition in order to suppress undesired randomly occurring noise components; and, applying the second signal to an indicating means and providing a continuous visual display which, after said interval of time, is representative of the rate of change of the reaction.

2. The method of claim 1 wherein said second electrical signal is provided and averaged by circuit means including an active filter having reactive components and including the step of equilizing the reactive elements to a zero rate condition prior to initiation of the analysis.

3. The method of claim 2 including the step of actuating a controlling means for equalizing said reactive elements and for releasing said controlling means for allowing said second signal to build up to said true rate indication.

4. The method of claim 1 including the step of damping said second electrical signal near critical damping.

5. The method of claim 1 wherein said second electrical signal is damped with a damping factor of about 0.85–0.90.

* * * * *